(No Model.)
F. M. SHAW, J. R. METHVEN & G. M. SHARP.
SELF ADJUSTING FRICTION CLUTCH.
No. 494,173. Patented Mar. 28, 1893.
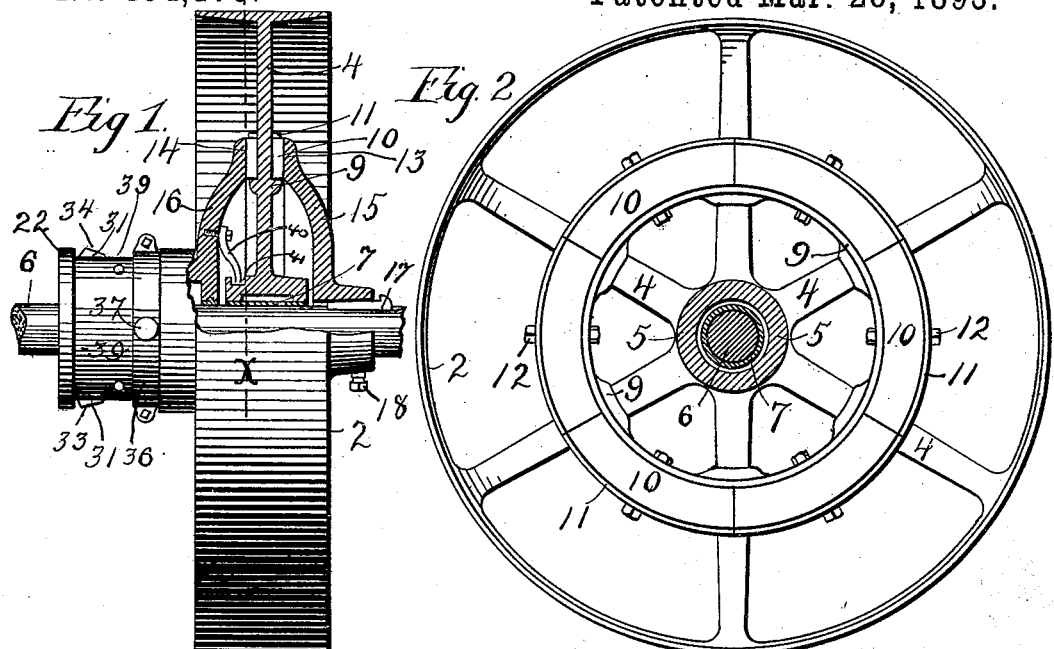
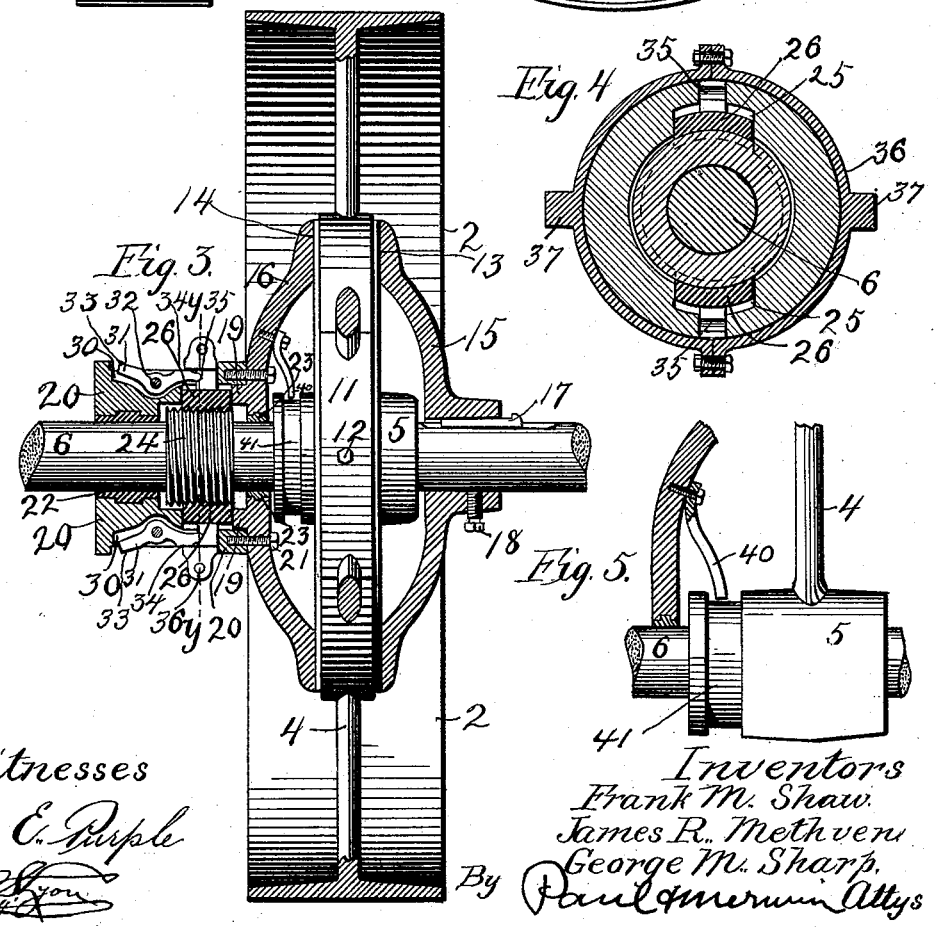
Witnesses
G. E. Purple
F. Nixon
Inventors
Frank M. Shaw
James R. Methven
George M. Sharp
By Paul & Merwin Attys

UNITED STATES PATENT OFFICE.

FRANK M. SHAW, JAMES R. METHVEN, AND GEORGE M. SHARP, OF MINNEAPOLIS, MINNESOTA.

SELF-ADJUSTING FRICTION-CLUTCH.

SPECIFICATION forming part of Letters Patent No. 494,173, dated March 28, 1893.

Application filed November 14, 1892. Serial No. 451,875. (No model.)

*To all whom it may concern:*

Be it known that we, FRANK M. SHAW, JAMES R. METHVEN, and GEORGE M. SHARP, all of Minneapolis, in the county of Hennepin, State of Minnesota, have invented a certain Improved Self-Adjusting Friction-Clutch, of which the following is a specification.

Our invention relates to friction clutches and the object of the same is to provide a cheaper and more efficient clutch than has heretofore been devised and a clutch which will occupy a small space upon the shaft and the parts of which will be fully protected from dust and grit.

To this end our invention consists in the combination with the shaft of the loose pulley mounted thereon, a friction gripping or clutching device to engage the pulley, a threaded collar or worm arranged on the shaft, movable threaded blocks to engage the worm, and means for operating said blocks whereby the gripping or clutching device may be caused to grip the pulley to lock the same upon the shaft, substantially as hereinafter described and particularly pointed out in the claims.

The invention will be more readily understood by reference to the accompanying drawings, in which;

Figure 1 is a side view of a friction clutch and pulley embodying our invention, portions of the same being broken away to show the interior construction. Fig. 2 is a partial sectional view on the line *x*— of Fig. 1. Fig. 3 is an enlarged longitudinal sectional view of the clutch mechanism. Fig. 4 is an enlarged transverse section on the line *y—y* of Fig. 3. Fig. 5 is a detailed view showing the lug arranged to engage the hub of the pulley to withdraw the same from the fixed friction ring or disk.

As shown in the drawings, 2 represents the pulley having the spokes 4 and the hub 5, which hub is loose upon the shaft 6 bearing upon the same through the bushing 7. On each of the spokes is a shoulder which may be formed by an integral ring 9 common to all the spokes as illustrated, which ring may have a polygonal form or the circular form shown. A friction ring is cut up into a number of sections 10 each having its ends slotted to embrace the sides of the spokes between which the particular block is inserted. On the outside of each block is a similarly formed curved clamping plate 11 and a bolt 12 extends through this plate, through the block and the ring 9 thereby firmly holding the block in place. After all of the blocks are thus secured a continuous wooden friction ring is made which has both of its sides exposed to the annular friction surfaces 13 and 14 of the cup shaped disks or rings 15 and 16 respectively. The ring 9 and the plates 11 are narrower than the blocks to permit wear. The disk 15 which is cup shaped to give room for the end of the hub 5 is secured upon the shaft 6 either by the key 17 or the set screw 18, or both. The other disk 16 has an annular rib 19 and is provided with the long sleeve or collar 20 which is secured thereto by bolts 21 as shown plainly in Fig. 3. The bearings of the disk 16 and the sleeve 20 are babbitted as shown at 22 and 23 and the same revolve freely on the shaft. The inside of the sleeve is hollow as shown to admit the screw collar or worm 24 secured on the shaft, the hollow being long enough to permit the sleeve to move longitudinally with respect to the worm. In each side of the sleeve are lateral guides 25 to receive the laterally movable blocks 26 which have the curved and threaded inner surfaces to engage the threads of the worm 24, this construction being set forth in Figs. 3 and 4. For operating these blocks we provide in the longitudinal recesses 30 of the sleeve two levers 31 pivoted on the pins 32 and each having the two bearing surfaces or edges 33 and 34. A gap is provided in each lever between its ends so that the ring may move through the intermediate part of the stroke without binding on the same. The inner ends of the levers are pivoted in sockets 35 arranged in the blocks so that as the levers are operated the blocks are moved in or out. For accomplishing this movement we provide the sliding ring 36 made in the two parts shown and bolted together. On each part of the ring is a trunnion 37 to be secured upon a suitable shipper rod by means of which the ring may be thrown from one end of the sleeve to the other to engage the opposite ends of the levers. The ring operates in the wide groove 39 of the sleeve and so in its inner position bears upon the end surfaces 33 and 34 of the levers thereby firmly holding the threaded blocks in engagement with the worm. When the shifting ring is thrown outward the blocks are withdrawn.

Suppose the pulley to be running freely on the shaft or that the shaft is running and the pulley stationary. Now by throwing the ring 36 inward on the sleeve, blocks 26 are forced into engagement with the worm 24; thereupon the disk 16 will be gradually moved into engagement with the wooden friction ring on the pulley and also force the ring into engagement with the fixed disk 15. As the blocks work forward on the worm this engagement becomes gradually stronger until the friction between the wooden ring on the pulley and the two friction disks becomes greater than the tension on the pulley or the shaft whereupon the pulley will begin revolving. If at any time the pulley slips on the shaft the disk 16 is screwed up still tighter on the worm to more firmly grip the pulley ring, this being done by the motion of the shaft. To free the pulley from the shaft it is only necessary to draw back the ring 36 which engages the ends 33 of the two levers thereby instantly removing the blocks 26 from engagement with the worm. As the shipper rod is moved out still farther the disk 16 is withdrawn from engagement with the face of the wooden friction ring, and for pulling the pulley away from the fixed disk we provide the lug 40 extending from the inside of the disk 16 into the wide groove 41 provided in the hub of the pulley. The width of the groove and the position of the lug therein are such that the disk 16 will first be permitted to move away from the pulley before the lug 40 engages the side of the groove 41 to withdraw the wooden ring from the face of the disk 15.

We thus provide a friction clutch which has its working parts completely inclosed from dust, which parts are confined closely to the shaft thereby preventing the possibility of their striking any adjacent stationary objects, and which occupies very small space on the shaft longitudinally, and which being made up of very few parts is most economical in manufacture.

Having thus described our invention, we claim as new and desire to secure by Letters Patent—

1. In a friction clutch, the combination with the shaft, of the clutch or clamping device, means for operating the same consisting of a worm arranged rigidly upon said shaft and a threaded block engaging said worm and movable radially and longitudinally of said shaft, and means for moving said block into engagement with said worm, substantially as and for the purposes set forth.

2. In a friction clutch, the combination with the shaft, of the clutch or clamping device, means for operating the same consisting of a worm arranged upon said shaft and a threaded block engaging said worm and movable laterally and longitudinally of said shaft, means for moving said block into engagement with said worm, and a sleeve inclosing said worm and said block and adapted to be moved by said block longitudinally of the shaft and said worm, substantially as and for the purposes set forth.

3. In a friction clutch, the combination with the shaft of a pulley and the sleeve loosely mounted on the shaft, a threaded block inside of said sleeve and movable in guides formed in the sleeve, means for moving said block into or out of engagement with a worm secured to said shaft, and a friction disk on said shaft into engagement with which said pulley is forced when said block is moved into engagement with said worm, substantially as and for the purposes specified.

4. In a friction clutch, the combination, with the shaft, of a pulley and a sleeve loosely mounted on said shaft, a fixed worm on said shaft, movable threaded blocks carried on said sleeve, short levers connected with said blocks and pivoted on the sleeve, a movable ring on said sleeve for operating said levers, and a friction disk on said shaft, into engagement with which said pulley is forced when said blocks engage said worm, substantially as described.

5. The combination with the shaft, of a friction disk arranged on the shaft to move therewith, the loose pulley provided with the friction ring, a movable friction disk arranged opposite the first disk and provided with a sleeve having bearings on said shaft, a worm upon the shaft and laterally movable threaded blocks provided on said sleeve and adapted to be moved into engagement with said worm whereby as the pulley or shaft revolves one with respect to the other said disk is moved into engagement with said friction ring and said ring into engagement with the other disk thereby clamping the pulley on the shaft, substantially as described.

6. The combination with the shaft, of the ring or disk connected therewith, the loose pulley provided with the sectional friction ring composed of wood, paper or like material, the movable disk 16 provided with the sleeve and loosely journaled on said shaft, a worm arranged within said sleeve, slidable blocks provided on the sleeve and threaded to correspond to said worm, short levers arranged on the sleeve and pivoted on said blocks, a longitudinally movable ring to alternately engage opposite ends of said levers whereby said blocks are thrown into or withdrawn from engagement with said worm, substantially as described.

7. The combination with the shaft, of the loose pulley journaled thereon, the sectional wooden friction ring provided on said pulley, the disk 16 journaled on said shaft and adapted to engage the opposite sides of the ring, a sleeve or hub on said disk 16, the laterally movable threaded blocks 26 carried by said sleeve, the pivoted levers 31 longitudinally arranged on said sleeve and engaging said blocks, the ring longitudinally movable on said sleeve and adapted to engage said levers to operate said blocks, and the threaded sleeve or worm 24 secured upon the shaft in position to be engaged by said blocks, substantially as described.

8. The combination with the shaft, of the loose pulley journaled thereon and provided with the ring 9, the wooden blocks 10 having the slotted ends to engage the spokes of the pulley, the clamping plates correspondingly slotted, bolts for securing said clamping plates and the blocks to the ring 9 and the pulley, a fixed friction disk on said shaft to engage one side of the ring made up by said blocks, the longitudinally movable disk 16 to engage the opposite side of the ring, and loosely journaled on the shaft, a worm provided on said shaft, laterally movable blocks carried by said sleeve and adapted to engage said worm, and means for operating said blocks, substantially as described.

9. The combination with the shaft, of the pulley journaled thereon and provided with the friction ring, the friction disk 15 fixed on said shaft to engage one side of said ring, the movable disk 16 to engage the opposite side of said ring, a worm provided on the shaft, movable threaded blocks carried on the sleeve or hub of said disk, means for operating said blocks, the hub of said pulley grooved as described and the lug 40 provided on said disk 16 and projecting into said groove whereby as the clutch is freed the disk 16 is first withdrawn from engagement with said ring and afterward said ring withdrawn from engagement with the fixed friction disk, substantially as described.

10. The combination in a friction clutch, of a shaft, with the loose pulley thereon, a fixed friction disk on said shaft, the ring 9 connected to the spokes of the pulley, the sectional blocks 10 having slotted ends to engage said spokes, the sectional plates 11 similarly slotted, bolts for securing said blocks and plates, and means for moving the pulley into engagement with said fixed friction disk, substantially as described.

In testimony whereof we have hereunto set our hands this 5th day of November, A. D. 1892.

FRANK M. SHAW.
JAMES R. METHVEN.
GEORGE M. SHARP.

In presence of—
C. G. HAWLEY,
FRED. S. LYON.